A. S. KROTZ.
RUBBER TIRE.
APPLICATION FILED MAY 7, 1919.
1,360,119.
Patented Nov. 23, 1920.
3 SHEETS—SHEET 1.
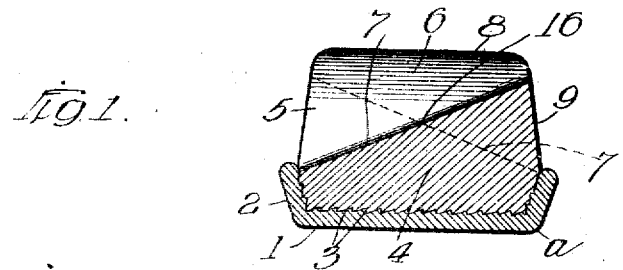
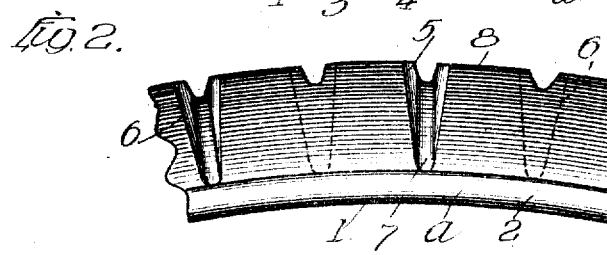
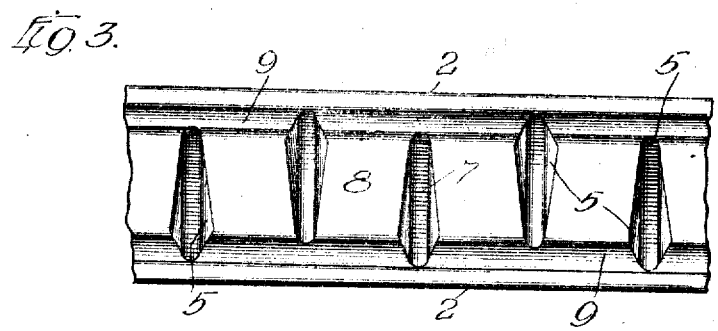
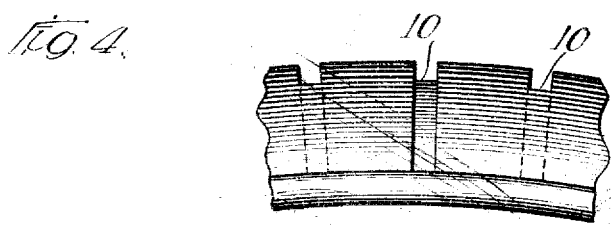
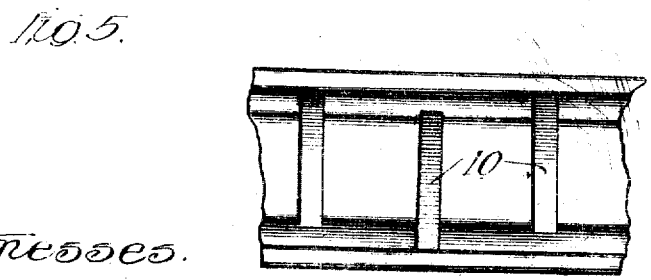
Witnesses.
Harry B. C. White
W. F. Kilroy
Inventor
A. S. Krotz.
By Arthur F. Durand
Atty

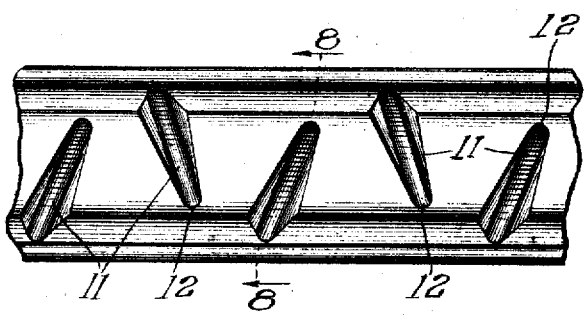
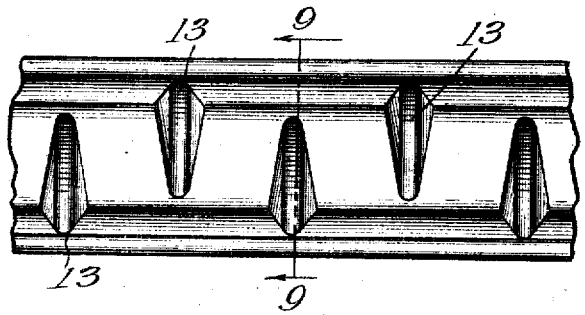
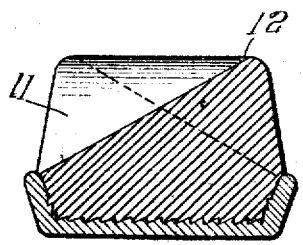
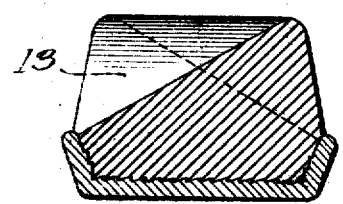

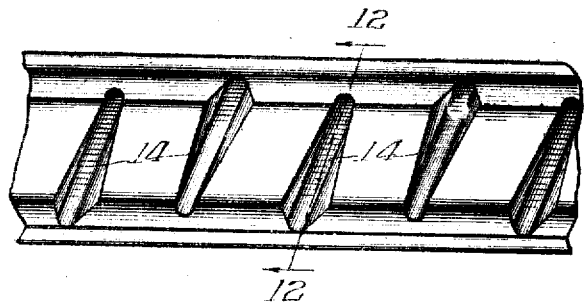
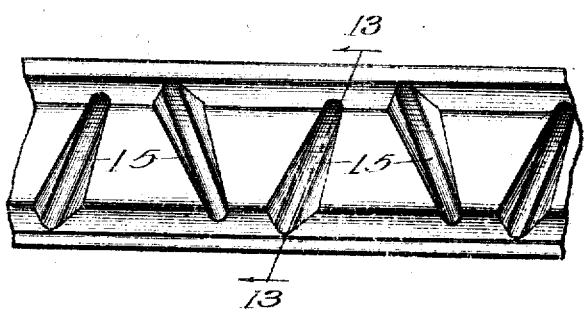
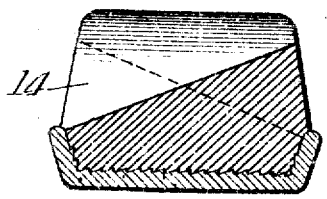
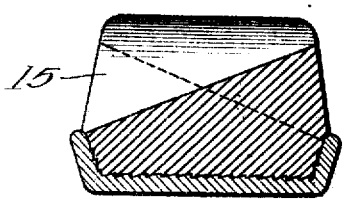

UNITED STATES PATENT OFFICE.

ALVARO S. KROTZ, OF JANESVILLE, WISCONSIN.

RUBBER TIRE.

1,360,119.  Specification of Letters Patent.  Patented Nov. 23, 1920.

Application filed May 7, 1919. Serial No. 295,288.

*To all whom it may concern:*

Be it known that I, ALVARO S. KROTZ, a citizen of the United States of America, and a resident of Janesville, Wisconsin, have invented a certain new and useful Improvement in Rubber Tires, of which the following is a specification.

This invention relates to rubber tires in general, but more particularly to those employed on carriages and electric vehicles, such as the solid rubber tires employed for this purpose, and also those used on motor trucks.

Generally stated, the object of the invention is to provide a novel and improved form of rubber tire having the tread thereof provided with notches which serve to not only increase the resiliency of the tire, but also to insure increased traction.

A special object of the invention is to provide a novel and improved arrangement and formation of said notches, with the idea of giving the tire more stability, and greater capacity to support a heavy load, without interfering with or in any way reducing the traction and non-slipping characteristics of the tire, and without seriously reducing the resiliency or cushioning effect of the tire.

Another object is to provide such a formation of the notches in the tire that mud and dirt will be forced out laterally from the sides of the tire, through the notches, instead of being compressed therein.

To these and other useful ends the invention consists, in matters hereinafter set forth and claimed and shown in the accompanying drawings, in which—

Figure 1 is a cross section of a rubber tire embodying the principles of the invention, showing the same seated in a channel rim.

Fig. 2 is a side elevation of a portion of the tire and rim shown in Fig. 1.

Fig. 3 is a view looking down on the portion of tire and rim shown in Fig. 2.

Fig. 4 is a view similar to Fig. 2, showing another form of the invention.

Fig. 5 is a view looking down on the portion of tire and rim shown in Fig. 4.

Fig. 6 is a view similar to Fig. 3, but showing a different form of the invention.

Fig. 7 is a view looking down on a portion of the tire and rim shown in Fig. 9.

Fig. 8 is a transverse section on line 8—8 in Fig. 6.

Fig. 9 is a transverse section on line 9—9 in Fig. 7.

Fig. 10 is a view similar to Fig. 3, showing a different form of the invention.

Fig. 11 is a view similar to Fig. 10, showing a different form of the invention.

Fig. 12 is a transverse section on line 12—12 in Fig. 10.

Fig. 13 is a transverse section on line 13—13 in Fig. 11.

As thus illustrated, and referring to Figs. 1, 2 and 3, the invention comprises a channel rim $a$ having a flat bottom 1, and flaring sides 2, the trough-like inner surface of the channel rim having teeth or projections 3, and the edges being preferably rounded. The rubber tire has a solid and continuous base portion 4 which is vulcanized in the channel rim, and the tread portion is provided with notches 5 having flaring sides 6 and an inclined bottom 7, the latter extending in a straight line from one edge of the channel rim across the tire to a point slightly below the tread surface 8 of the tire, as shown in Fig. 1, so that each notch is deeper at one side than at the other. The sides 9 of the tire are inclined toward each other, and said notches preferably alternate, so that one notch is deep at one side of the tire, and the next notch is deep at the opposite side of the tire, whereby the bottoms 7 of the notches cross each other at an angle when the tire is viewed in cross section. The bottoms 7 of the notches are preferably formed by trough-like and rounded grooves, in the manner shown.

With this formation, the tire is capable of supporting the maximum load weight in a satisfactory manner, and at the same time the tire has sufficient resiliency and also sufficient traction on the ground. In addition, when the tire is traveling in mud or soft ground, the dirt will be forced out laterally from the sides of the tire, through the notches formed in the tread, because of the inclined formation of the bottom of each notch, the dirt being forced from the shallow end of the notch toward the deep end thereof, and out from the larger end of the notch, as the tire sinks into mud or soft ground.

As shown in Figs. 4 and 5, the construction is substantially the same as that previously described, except that in this case the notches 10 have parallel sides instead of having inclined or flaring sides like those shown in Figs. 2 and 3.

In Figs. 6 and 8 the construction is similar to that previously described, but in this case the notches 11 are disposed obliquely or at angles to the circumference of the tire, one notch being turned at an angle one way, and the next notch being turned at an angle the other way, so that alternate notches are oblique and parallel, while the intermediate notches are oblique and parallel. Thus the notches are not only disposed obliquely to the tread of the tire, but are also disposed at angles to each other. In addition, the shallow end of each notch terminates at 12 on the tread surface of the tire, so that each notch only shows at one side of the tire, and does not show at the other side, when the tire is viewed in side elevation. In other words, each notch extends from its deep or large end across the tire to a point adjacent the other side thereof, but does not extend entirely through to the other side, and with this formation each notch tapers off to nothing at a point on the tread of the tire, near one side thereof. With this formation the dirt and mud can only escape from the larger end of each notch, and cannot be forced out at the other side of the tire.

Figs. 7 and 9 show a construction similar to that shown in Figs. 6 and 8, but in this case the notches 13 are not obliquely arranged, and are exactly crosswise or at right angles to the circumference of the tire.

In Figs. 10 and 12 the construction is similar to that shown in Figs. 1, 2 and 3, inasmuch as the notches 14 extend entirely across the tread of the tire, so that each notch shows at both sides of the tire: but, as shown, these notches 14 are all turned at an angle to the circumference of the tire, so that they are obliquely arranged, and they all have the same angle.

In Figs. 11 and 13 the formation of the tire is similar to that shown in Fig. 12, but in this case the notches 15 are arranged alternately at opposite angles, like those shown in Fig. 6, so that some are at one angle and some are at a different angle; but, as shown, these notches 15 extend entirely across the tire, like those shown in Figs. 1 and 12, so that each notch shows at opposite sides of the tire, when the latter is viewed in side elevation.

From the foregoing it will be seen that the tire has a continuous or solid base portion which is vulcanized on the channel rim, and has a sectional tread formed by notches which tend to increase the resiliency of the tire, as well as the traction thereof, but which render the tire more stable under a heavy load than would be true if the notches were of maximum depth at both sides of the tire, for in the latter event there would be less rubber to support the load weight. Again, the inclined bottom of each notch tends to force the mud and dirt out laterally from under the tire, when it travels in soft ground, instead of being compressed and solidified in the notches, as is often the case when solid rubber tires of this class are formed with sectional treads, or with notches or recesses in the tread portions thereof. In each form of the invention, however, as described and shown, each notch extends from its point of maximum depth at one edge of the channel-rim to a point of minimum depth adjacent the other side of the tire, and thus terminates either in the side of the tire, or in the tread of the tire quite close to the side of the tire, thereby insuring notches which practically extend entirely across the tread of the tire, leaving no continuous central portion extending circumferentially midway between the two sides of the tire at the tread thereof, as would be the case if each notch extended only to a point a little short of the transverse center of the tread, or even to a point exactly at the center, as in such case there would be in effect a continuous central ridge extending peripherally of the tire at the center of the tread thereof. In other words, the central portion of the tread is broken at intervals by notches which are, at this point, of such character that they extend about half way from the tread 8, as shown in Fig. 1, to the base portion of the tire, or perhaps a little more or a little less, depending upon whether the notch extends entirely through and terminates in the side of the tire, as shown in Fig. 1, or terminates at the tread of the tire, as shown in Fig. 8. As explained, the lines forming the bottoms of the notches cross each other at an angle, when the tire is viewed in cross section, the point of intersection, such as the point 16 in Fig. 1, or the point 17 in Fig. 8, being midway between the two sides of the tire, and substantially or approximately half way between the tread of the tire and the base portion thereof, this base portion being the portion of rubber embraced between the sides 2 of the channel rim.

These tires, of course, can be used on carriages or motor vehicles, and can be made in different sizes, depending upon the character and purposes of the vehicle, and depending upon the maximum load weight to be carried. Being molded and vulcanized in the annular channel rims, the rubber is not under tension except when in action on the ground, and only where it supports the load weight. Under compression, the mud and dirt will be squeezed out from under the tire, through the larger ends of the notches, and thus the tire is self-cleaning, so to speak, and does not tend to collect or accumulate hard and compressed masses of earth within the notches.

As shown, for example, in Fig. 1 or in Fig. 8, each notch terminates at each end approximately at the side of the tire, with practically the entire width of the tread, or flat tread surface included between the opposite ends of each notch, and between the tread terminals of said notches, which terminals are, of course, the shallow ends of said notches, the base terminals being the ends of the notches adjacent the base and rim of the tire.

What I claim as my invention is:—

1. In combination, a channel rim, and a solid one-piece rubber tire seated in said rim, having oblique notches to divide the tread into sections, the alternate notches tapering toward one side of the tire, and the intermediate notches tapering toward the other side of the tire, so that each oblique notch is deep at one end and shallow at the other end, and whereby in cross section the inclined bottom line of one oblique notch intersects the inclined bottom line of another oblique notch, with at least the greater portion of the tread included in the angle between the two lines.

2. A rubber tire structure as specified in claim 1, each notch being wider at its deep end than at the shallow end thereof.

3. A rubber tire structure as specified in claim 1, each notch extending entirely across the tread.

4. In combination, a channel rim, and a solid one-piece rubber tire seated in said rim, having notches to divide the tread into sections, the alternate notches tapering toward one side of the tire, and the intermediate notches tapering toward the other side of the tire, so that each notch is wide and deep at one end and narrow and shallow at the other end, and whereby in cross section the inclined bottom line of one notch intersects the inclined bottom line of another notch, with each notch tapered gradually from the tread to the rim when the tire is viewed from either side thereof.

5. In combination, a channel rim and a solid one-piece rubber tire seated in said rim, having notches to divide the tread into sections, the alternate notches tapering toward one side of the tire, and the intermediate notches tapering toward the other side of the tire, so that each notch extends a distance toward the rim on one side of the tire and a greater distance on the other side thereof, and whereby in cross section the inclined bottom line of one notch intersects the inclined bottom line of another notch, with at least the greater portion of the tread included in the angle between the two lines.

ALVARO S. KROTZ.